United States Patent
Hupli et al.

(10) Patent No.: US 7,178,486 B2
(45) Date of Patent: Feb. 20, 2007

(54) METHOD OF REDUCING NITROGEN OXIDE (NOX) EMISSIONS IN SUPERCHARGED PISTON ENGINE AND PISTON ENGINE ARRANGEMENT

(75) Inventors: Juhani Hupli, Mustasaari (FI); Daniel Paro, Kvevlax (FI)

(73) Assignee: Wartsila Finland Oy, Vaasa (FI)

( * ) Notice: Subject to any disclaimer, the term of this patent is extended or adjusted under 35 U.S.C. 154(b) by 133 days.

(21) Appl. No.: 10/508,365

(22) PCT Filed: Mar. 13, 2003

(86) PCT No.: PCT/FI03/00193

§ 371 (c)(1),
(2), (4) Date: Sep. 17, 2004

(87) PCT Pub. No.: WO03/078819

PCT Pub. Date: Sep. 25, 2003

(65) Prior Publication Data

US 2005/0161009 A1    Jul. 28, 2005

(30) Foreign Application Priority Data

Mar. 20, 2002 (FI) .................................. 20020537

(51) Int. Cl.
*F02B 47/02* (2006.01)
*F02B 45/00* (2006.01)
*F02C 6/18* (2006.01)

(52) U.S. Cl. ................ 123/25 J; 123/25 C; 123/25 A; 60/780

(58) Field of Classification Search ............... 60/605.1, 60/775, 780; 123/25 A, 559.1, 563, 25 R, 123/25 B, 25 C, 25 D, 25 J, 25 L
See application file for complete search history.

(56) References Cited

U.S. PATENT DOCUMENTS

| | | | | |
|---|---|---|---|---|
| 3,167,913 A | * | 2/1965 | Muhlberg et al. | 60/780 |
| 3,224,186 A | * | 12/1965 | Wood | 60/599 |
| 4,438,731 A | * | 3/1984 | Maggio | 123/25 J |
| 4,958,598 A | * | 9/1990 | Fosseen | 123/25 J |
| 4,960,080 A | | 10/1990 | O'Neill et al | 60/605.1 |
| 5,542,379 A | * | 8/1996 | Kessler | 123/25 C |
| 5,657,630 A | * | 8/1997 | Kjemtrup et al. | 60/605.2 |
| 5,682,842 A | * | 11/1997 | Coleman et al. | 123/25 C |
| 5,758,606 A | * | 6/1998 | Rosen et al. | 123/25 B |
| 5,809,981 A | * | 9/1998 | Berg-Sonne | 123/563 |
| 6,082,311 A | | 7/2000 | Collin | 123/25 A |
| 6,145,498 A | * | 11/2000 | Packard et al. | 123/563 |

(Continued)

FOREIGN PATENT DOCUMENTS

EP    0 742 363    11/1996

(Continued)

*Primary Examiner*—Thai-Ba Trieu
(74) *Attorney, Agent, or Firm*—Smith-Hill and Bedell

(57) ABSTRACT

A piston engine is operated by pressurizing combustion air to a pressure above ambient pressure and adding water to the combustion air, and supplying the pressurized combustion air to which water has been added to a combustion chamber. An emulsion of fuel and water is sprayed into the combustion chamber. A desired rate of supply of water to the combustion chamber is determined and, in the event that the desired rate of supply of water changes, the rate of supply of water to the combustion chamber is adjusted by regulating the addition of water to the combustion air.

23 Claims, 1 Drawing Sheet

U.S. PATENT DOCUMENTS

Figure 1:
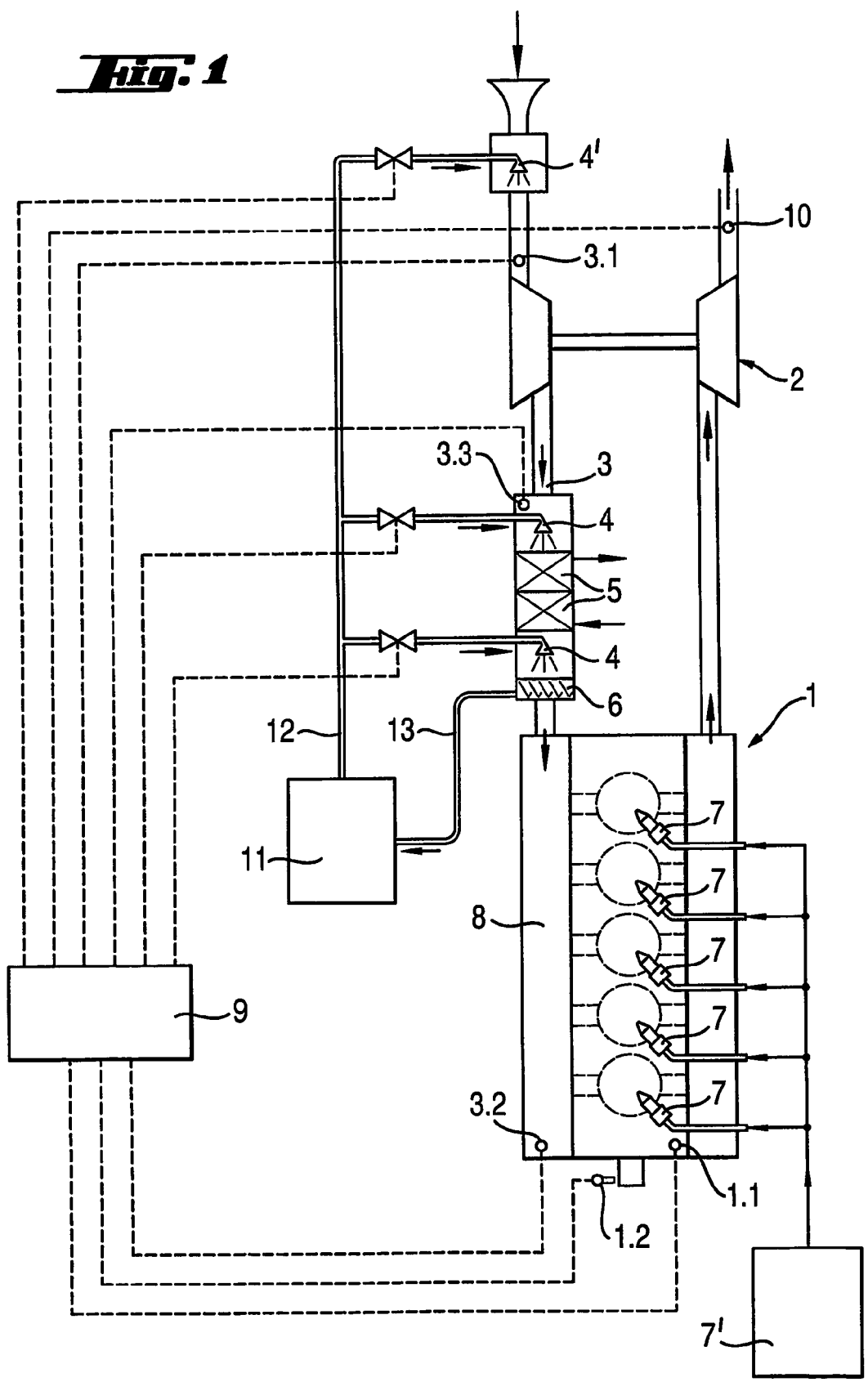

| | | | |
|---|---|---|---|
| 6,196,165 B1 * | 3/2001 | Rosen et al. | 123/25 B |
| 6,289,666 B1 * | 9/2001 | Ginter | 60/775 |
| 6,405,686 B1 * | 6/2002 | Wettergard | 123/25 A |
| 6,564,556 B2 * | 5/2003 | Ginter | 60/775 |
| 6,817,182 B2 * | 11/2004 | Clawson | 60/670 |
| 6,817,348 B2 * | 11/2004 | Wettergard et al. | 123/559.1 |
| 6,912,978 B2 * | 7/2005 | Raikio et al. | 123/25 R |

FOREIGN PATENT DOCUMENTS

| | | |
|---|---|---|
| EP | 0 916 836 | 5/1999 |
| EP | 1 076 169 | 2/2001 |
| EP | 1205659 A2 * | 5/2002 |
| GB | 2 259 326 | 3/1993 |
| JP | 61049128 A * | 3/1986 |
| JP | 08109853 A * | 4/1996 |
| JP | 2000-161096 | 6/2000 |
| WO | 94/29579 | 12/1994 |
| WO | WO 2005038229 A1 * | 4/2005 |

\* cited by examiner

US 7,178,486 B2

METHOD OF REDUCING NITROGEN OXIDE (NOX) EMISSIONS IN SUPERCHARGED PISTON ENGINE AND PISTON ENGINE ARRANGEMENT

This is a national stage application filed under 35 USC 371 based on International Application No. PCT/FI2003/00193 filed Mar. 13, 2003, and claims priority under 35 USC 119 of Finnish Patent Application No. 20020537 filed Mar. 20, 2002.

TECHNICAL FIELD

The invention relates to a method of reducing nitrogen oxide (NOx) emissions in a supercharged piston engine and to a piston engine arrangement.

BACKGROUND ART

In high combustion temperatures, nitrogen oxides (NOx) are formed in the piston engine's cylinder, which are released to the air with the exhaust gases. Because of the environmentally detrimental effects of the nitrogen oxide emissions, efforts have been made to minimise them.

Adding water with the combustion air to the combustion process reduces, as is well known, the generation of nitrogen oxide emissions. This phenomenon is based, among other things, on the cooling effect of the water. In practice, adding water to the piston engine's combustion process has been put into practice mainly in three different alternative ways so that water is fed either directly to the engine's combustion chamber, water is fed with the fuel as a fuel emulsion or the feeding of the water is brought about through a suction air channel to the suction air.

In publication U.S. Pat. No. 5,758,606, a method of feeding water to the engine's suction air subsequent to the supercharger has been presented. The water is first heated with the engine's cooling water and fed into a separate humidifying tower, in which the water sprayed into mist evaporates. This kind of arrangement is impractical e.g. because of the space the humidifying tower requires and it brings about a certain security risk as the large-size humidifying tower operates under high pressure. Also documents EP-A-0916836, U.S. Pat. No. 4,960,080, EP-A-1076169 and U.S. Pat. No. 6,082,311 disclose a supercharged engine, wherein water content of the combustion air is increased before bringing the air into the combustion chamber.

Feeding water with the suction air to the combustion space does not, as such, decrease the shaft efficiency of the engine, but in certain conditions the temperature of the suction air would have to be raised high, so that the air humidity could reach, from the point of view of reducing the nitrogen oxide emissions, a sufficient level, which in turn reduces the mass flow rate and the oxygen content of the air. The amount of water obtained evaporated in the combustion space can therefore only be the amount, which remains in gaseous form in suction air's pressure- and temperature conditions. Therefore, the amount of water obtained in the combustion space with the suction air is limited by the saturation of water vapour in the conditions of the suction air. The amount of water needed is relatively high because, due to the continuous humidification of the suction air, part of the water cannot be exploited because it exits during the cylinder's scavenging stage, in which case both the suction valve and the exhaust valve are open at the same time.

In publication EP 0 683 307 A1, an equipment for feeding water directly to the engine's cylinders has been presented depending on the firing order of the engine. Water is sprayed during the suction stroke controlled by the regulating unit, which uses the engine's rotation speed, the position of the piston and/or the engine's operating conditions as input data. In this kind of solution, the problem is e.g. the optimal water distribution to the combustion space, so that too much water doesn't have to be sprayed and, on the other hand so that the desired effect is obtained. In addition, the feeding of the water directly to the combustion space requires a rather complicated equipment. The feeding of the water and the fuel can also be carried out alternately with the same nozzle arrangement.

Feeding water directly to the combustion space is known as such also by feeding water with the fuel as an emulsion. This solution is advantageous in many ways, but its particular problem is that the equipment has to be dimensioned, determined by the combined fuel and water flow rate, relatively high in its capacity. In this case, especially with partial load, the operation is not quite optimal. In publication EP 0 742 363, a solution has been presented to the problem of conventional fuel-water-emulsion injection. Used as such, the preparation systems of the fuel-water-emulsion can be relatively complicated and the control of the water amount thereof is slow.

It is an object of the invention to provide an improved method and arrangement of reducing nitrogen oxide emissions and also smoke formation in a supercharged piston engine, which is based on taking advantage of water in the combustion process, but of which the defects of the prior art techniques have been essentially eliminated. To be more precise, it is an object of the invention to provide a method and an arrangement in which water-fuel emulsion is used as is shown in publication EP 0 742 363, but in which shortcomings of such system and method are eliminated.

DISCLOSURE OF THE INVENTION

In the method according to the invention of reducing nitrogen oxide emissions (NOx) in a supercharged piston engine, the pressure of the combustion air is increased to a level higher than that of the ambient pressure by means a supercharger equipment, and in which water is sprayed as an emulsion into the engine's combustion space with the same injection equipment as during the fuel injection. Further, in the method, the water content of the combustion air is increased before bringing the combustion air into the engine's combustion space and the total water amount required is adjusted by regulating the amount of water fed to the combustion air.

According to the method of invention, while the engine is running, both the water feeding requirement and the feeding location are continuously determined based on the measuring and/or determination of the engine's operating conditions as well as on the degree of capacity utilisation of the fuel feeding system. This way, the accurate information obtained from the fuel feeding system of the amount of fuel-water-emulsion to be sprayed, and in this way also of the amount of water brought in via this route, can be utilised.

According to an embodiment of the invention, the fuel amount is adjusted according to the engine's load; the amount of water fed with the fuel is adjusted so that it is at its maximum the difference of the feed amount conform to the maximum capacity of the fuel feeding system and the fuel amount to be fed, and that the amount of water to be fed to the combustion air is adjusted in such a way that its quantity corresponds at least to the amount equalising the difference of the predetermined nitrogen oxide emission level and the nitrogen oxide emission level caused by the amount of water to be fed with the fuel.

According to another embodiment of the invention, the amount of water of the fuel-water-emulsion is maintained nearly constant. To be more precise, the amount of water to be fed to the combustion air is adjusted according to the engine's load, advantageously according to the pressure of the combustion air. In order to be able to spray the water always in an advantageous form to the combustion air, the injection has been put into practice so that the injection pressure in each nozzle is maintained nearly constant. The amount of the water to be sprayed is adjusted by keeping in operation the amount of nozzles required at any given time. Therefore there are several nozzles, which are adjusted according to the on-off principle, in which case there are always necessary amount of nozzles in use.

According to the invention, the fuel-water-emulsion contains water advantageously from 10% to 55% of the fuel amount, and the amount of water to be fed with the combustion air is 0.5–5 times the amount of the fuel fed. The water content of the fuel-water-emulsion is maintained nearly constant, in other words it is not adjusted according to the dynamics of the rapid load variations of the engine. Whereas by adjusting the amount of water to be fed to the combustion air, a control based on the actual load of the engine is provided. The water sprayed to the combustion air is advantageously liquid, but it may in some cases also be steam.

The control of the method is further simplified when the amount of water to be fed to the combustion air is adjusted to be slightly bigger than the amount of water required for the saturation of air in theory, and water remained in liquid form is separated from the combustion air before leading air into the engine's combustion space.

The piston engine arrangement according to the invention comprises several cylinders, a turbocharger arranged in flow connection with each of the cylinders through a combustion air channel and equipment for feeding the fuel-water-emulsion and, in addition, there are nozzles in connection with the cylinders for feeding the fuel-water-emulsion to each cylinder. Furthermore, in the piston engine arrangement according to the invention, a nozzle arrangement comprising a number of nozzles that can be opened and closed independently is arranged in the combustion air channel for bringing the water to the combustion air subsequent to the turbocharger in the combustion air flow direction.

In the combustion air channel, there is advantageously adapted at least one drop separator for separating liquid water from the combustion air before its leading to the engine's cylinder. The engine arrangement further comprises, advantageously, a water preheating arrangement connected to the said nozzle arrangement, in which case the drop separator is in flow connection with the water preheating arrangement.

Several advantages are obtained with the invention, such as a far more efficient combined reduction of nitrogen oxides and smoke formation from the exhaust gases. Further, the total water consumption with the method according to the invention is also lower than with the known solutions, and also the fuel specific consumption is very low with the method according to the invention. In the solution according to the invention, the fuel drop formation and this way the combustion becomes more efficient when the water in the form of an emulsion evaporates in the fuel, bringing about the disintegration of the fuel drop.

The invention will be described below, by way of example, with reference to the accompanying drawing, in which FIG. 1 shows a schematic illustration of an embodiment according to the invention.

In FIG. 1, the reference 1 implies a piston engine, which has been connected to a turbocharger 2 in a manner known per se. In connection with each cylinder of the engine 1, there has been arranged a fuel injection nozzle 7, by means of which a mixture of fuel and water, fuel-water-emulsion, is fed into the engine. The system also comprises equipment for feeding the fuel-water-emulsion 7'. It is possible that the fuel is acquired as a ready-made emulsion, in which case equipment 7' comprises primarily only the fuel feeding arrangement, but it is also possible that the equipment for feeding fuel-water-emulsion comprises also the production equipment of the fuel-water-emulsion. Feeding fuel-water-emulsion reduces the engine's nitrogen oxide emissions considerably. The amount of water in the fuel-water-emulsion in maintained advantageously constant, the water comprising typically from 10% to 55% of the fuel amount. The water content of the fuel can be kept as high as possible, considering however the limits set by the fuel system and the fuel to be used. If the proportion of water and fuel is changed, it takes place advantageously according to the engine's load.

In channel 3 connecting the supercharger 2 and the engine, there is arranged a nozzle arrangement 4 in connection with line 12 for feeding water to the combustion air. There may also be a corresponding nozzle arrangement 4' prior to the compressor of the supercharger. In the Figure, the water system has been represented with the reference 11. According to the needs, it may comprise e.g. a steam generator or a water preheating device. In channel 3, there has also been arranged a heat exchanger arrangement 5 for altering the temperature of the combustion air. The channel 3 is connected to the engine's 1 air chamber 8, from which air is led to each of the engine's cylinders. In the Figure there has also been shown a drop separator 6 used advantageously in the arrangement. From the drop separator 6, a channel 13 is arranged to the water system 11, which allows the recycling and reuse of the water separated from the combustion air. In this way, more water can be brought, if the need arises, to the combustion air than the amount theoretically sufficient to saturate the air. With the nozzle arrangement 4, 4', the combustion air water content is increased before bringing the combustion air into the engine's combustion space. The amount of water to be fed to the air is chosen advantageously each time to be such that the air is essentially saturated. Typically, the amount of water coming along with the combustion air is about 0.5–5 times the amount of the fuel fed. On a case-by-case basis, the water can be fed either as liquid or as vapour.

To implement the method according to the invention, the engine's control system 9 has been arranged to collect information from several different locations of the engine. The condition of the engine's combustion air is determined with a measuring element 3.1 arranged prior to the compressor. There may also be an additional measuring element 3.3 positioned after the compressor, as is shown in the FIG. 1. Further, the condition of the combustion air, as well as of the so-called supercharging pressure, is determined by means of a measuring element 3.2 arranged in connection with the engine's 1 combustion air chamber 8. The condition of the engine's exhaust gas is determined according to the measuring data of the measuring element 10. The engine's operation is further followed with the help of the measurements of the measuring elements 1.1 and 1.2. Out of these, especially the measuring element 1.2 has been arranged to measure the load and rotation speed of the engine.

In the method according to the invention, bringing the water to the combustion process takes place in a combined manner both with fuel and combustion air. In this way, by using two separate systems, the control of the water amount can be put into practice advantageously so that the water content of the fuel-water-emulsion is made approximately constant and the total water amount required is adjusted by controlling and adjusting the amount of water to be fed to the combustion air. The amount of water to be fed to the combustion air is adjusted advantageously according to the engine's load, of which e.g. the combustion air pressure may be an appropriate indicator. The amount of water to be fed to the combustion air is adjusted by opening and closing, according to the need of any given time, an appropriate number of water injection nozzles, and the injection pressure is in each of the nozzles nearly constant. In this way, an advantageous drop formation or atomisation of the water and, in the same time, the right amount of water to the combustion air is provided.

The method according to the invention is advantageously implemented in such a way that the fuel-water-emulsion contains a constant quantity of water, typically from 10% to 55% of the fuel amount and liquid water pre-heated in the source of water is used for humidifying the combustion air. Consequently, the total amount of water required is adjusted by regulating the amount of water to be fed to the combustion air such that the amount of water to be fed to the air always exceeds theoretically the amount of water needed for the saturation of air. In the method, the water in a liquid form is further separated from the combustion air before its leading to the engine's combustion space and the separated water is recycled to the source of water to be reused.

The invention is not limited to the embodiments shown, but several modifications are feasible within the scope of the attached claims.

The invention claimed is:

1. A method of operating a piston engine having a combustion chamber, said method comprising:
   pressurizing combustion air to a pressure above ambient pressure and adding water to the combustion air,
   supplying the pressurized combustion air to which water has been added to the combustion chamber,
   spraying an emulsion of fuel and water into the combustion chamber,
   determining a desired rate of supply of water to the combustion chamber, and
   in the event that the desired rate of supply of water changes, adjusting the rate of supply of water to the combustion chamber by regulating the addition of water to the combustion air.

2. A method according to claim 1, comprising employing a compressor to pressurize the combustion air and adding water to the combustion air both at a location upstream of the compressor and at a location downstream of the compressor.

3. A method according to claim 2, comprising continuously determining the desired rate of supply of water while the engine is running and continuously determining the location at which water should be added to the combustion air based on the engine's operating conditions while the engine is running and the rate of supply of fuel to the combustion chamber.

4. A method according to claim 1, comprising mixing water and fuel to create the emulsion.

5. A method according to claim 4, comprising adjusting the rate of supply of fuel to the engine according to the engine's load, controlling the proportion of water that is mixed with the fuel to create said emulsion so that the rate of supply of water with the fuel is at a maximum the difference between the maximum rate of supply of the fuel feeding system and the desired rate of supply of fuel, and controlling the rate of addition of water to the combustion air to correspond to the difference between a predetermined nitrogen oxide emission level and the nitrogen oxide emission level achieved by the water fed with the fuel.

6. A method according to claim 1, comprising maintaining the amount of water in the fuel-water emulsion substantially constant.

7. A method according to claim 6, comprising adjusting the rate of addition of water to the combustion air according to the engine's load.

8. A method according to claim 7, comprising adjusting the amount of water mixed with the combustion air according to the combustion air pressure.

9. A method according to claim 6, wherein the fuel-water emulsion contains water in an amount from 10% to 55% of the fuel amount, and the rate of supply of water with the combustion air is 0.5–5.0 times the rate of supply of fuel.

10. A method according to claim 1, wherein the step of adding water to the combustion air comprises spraying liquid water into the combustion air.

11. A method according to claim 1, wherein the step of adding water to the combustion air comprises spraying water vapor into the combustion air.

12. A method according to claim 1, wherein the step of adding water to the combustion air comprises adding water in excess of the amount theoretically required for saturation of the air, and the method further comprises separating liquid water from the combustion air before supplying the pressurized combustion air to the combustion chamber.

13. A method of reducing nitrogen oxide (NOx) emissions in a supercharged piston engine, said method comprising:
   supercharging the combustion air to a pressure higher than the ambient pressure;
   delivering the supercharged combustion air into the engine's combustion space;
   spraying water into the engine's combustion space as an emulsion in connection with the fuel injection with the same injection equipment;
   increasing the water content of the combustion air by feeding water to the combustion air before delivering the combustion air into the engine's combustion space;
   adjusting the total water amount required by regulating the amount of water fed to the combustion air; and
   maintaining nearly constant the amount of water of the fuel-water emulsion,
   and wherein the fuel-water emulsion contains water from 10% to 55% of the fuel amount, and the amount of water fed with the combustion air is 0.5–5 times the amount of fuel fed.

14. A method according to claim 13, comprising continuously determining both the water feeding requirement and the feeding location while the engine is running, based on the measuring and/or determination of the engine's operating conditions and the degree of capacity utilization of the fuel feeding system.

15. A method according to claim 13, comprising:
   adjusting the fuel amount according to the engine's load;
   adjusting the amount of water fed with the fuel so that it is at its maximum the difference between the feed amount corresponding to the maximum capacity of the fuel feeding system and the fuel amount to be fed; and adjusting the amount of water to be fed to the combustion air in such a way that its quantity corresponds at least to the amount equalizing the difference between a predetermined nitrogen oxide emission level and the nitrogen oxide emission level caused by the amount of water to be fed with the fuel.

16. A method according to claim 13, comprising adjusting the amount of water to be fed to the combustion air according to the engine's load.

17. A method according to claim 16, comprising adjusting the amount of water to be fed to the combustion air according to the combustion air pressure.

18. A method according to claim 13, comprising increasing the water content of the combustion air by spraying liquid water into the combustion air.

19. A method according to claim 13, comprising increasing the water content of the combustion air by spraying water vapor into the combustion air.

20. A method according to claim 13, comprising adjusting the amount of water to be fed to the combustion air to be greater than the amount of water required for the saturation of air in theory, and separating liquid water from the combustion air before leading air into the engine's combustion space.

21. A piston engine having multiple cylinders and comprising:
a supercharger for supplying combustion air at a pressure above ambient pressure to respective combustion chambers of the cylinders through a channel connected to an outlet of the supercharger,
multiple fuel injector nozzles for injecting an emulsion of fuel and water into the combustion chambers,
a plurality of water supply nozzles for adding water to the combustion air, the water supply nozzles being operable independently of one another for opening and closing, and
a drop separator in the channel for separating liquid water from the combustion air before entering the combustion chambers.

22. A piston engine according to claim 21, comprising a water preheater connected to the water supply nozzles and wherein the drop separator is in flow connection with the water preheater for supplying liquid water separated from the combustion air to the water preheater.

23. A piston engine according to claim 21, comprising a plurality of sensors for sensing engine operating conditions and a control system responsive to the sensors for selectively operating the water supply nozzles.

* * * * *